March 10, 1959 F. F. ZAWASKI 2,876,603
BASKET LOADER
Filed June 11, 1957 10 Sheets-Sheet 1

INVENTOR.
Felix F. Zawaski
BY
Harness, Dickey & Pierce
ATTORNEYS

March 10, 1959

F. F. ZAWASKI 2,876,603

BASKET LOADER

Filed June 11, 1957

INVENTOR.
Felix F. Zawaski.
BY
Barnes, Dickey & Pierce
ATTORNEYS

March 10, 1959 F. F. ZAWASKI 2,876,603
BASKET LOADER
Filed June 11, 1957 10 Sheets-Sheet 3

INVENTOR.
Felix F. Zawaski
BY
Harness, Dickey & Pierce
ATTORNEYS

March 10, 1959 F. F. ZAWASKI 2,876,603
BASKET LOADER
Filed June 11, 1957 10 Sheets-Sheet 9

INVENTOR.
Felix F. Zawaski
BY
Harness, Dickey & Pierce
ATTORNEYS.

United States Patent Office 2,876,603
Patented Mar. 10, 1959

2,876,603

BASKET LOADER

Felix F. Zawaski, Dearborn Township, Wayne County, Mich., assignor to Michigan Tool Company, Detroit, Mich., a corporation of Delaware Application June 11, 1957, Serial No. 665,000

12 Claims. (Cl. 53—59)

This invention relates to loading mechanisms, and more particularly to devices for loading parts such as workpieces into baskets for further transport and handling.

It is an object of the invention to provide an improved basket loading device which is especially adapted for automatically loading a plurality of workpieces such as gears into baskets which are conveyed successively into and from loading position, the arrangement being especially adapted for use in automated production lines.

It is another object to provide an automatic basket loading device of this character which may load successive groups of parts in basket rows, thus speeding the loading operation.

It is also an object to provide an improved basket loading device of the above nature, which may be used to handle finished parts such as bored pinions at high speed without the danger of marring the parts during the loading process.

It is a further object to provide an improved parts loading machine of this character which eliminates the need for manual parts handling operations and insures against the possibility of faulty or erratic loading which might damage the parts or machine.

It is another object to provide an improved loading device of this nature which is especially adapted for loading parts in stacked or exposed positions in wire baskets or the like so that the parts may be subjected to surface treating processes or may be easily removed by operators.

It is also an object to provide an improved basket loader of this nature which is of rugged and foolproof construction and is relatively inexpensive to maintain.

Other objects, features and advantages of the present invention will become apparent from the subsequent description, taken in conjunction with the accompanying drawings.

In the drawings:

Figure 9 is a fragmentary cross-sectional view in elevation taken along the line 9—9 of Figure 1 and showing the drive for the conveyor chain;

Figure 18 is a circuit diagram illustrating a suitable electrical circuit for controlling and operating the automatic basket loader.

In general terms, the invention comprises an elongated base having a horizontal basket conveyor mounted thereon at a height convenient to an operator standing alongside the machine. Empty baskets or similar containers are loaded at one end of the unit and are carried by the conveyor toward the loading station. At this station, parts are fed from a conveyor above the baskets to a chute which permits the parts to drop into loading position. In the illustrated embodiment of the invention, loading of center-bored pinions is accomplished by feeding these pinions in groups to the chute which re-orients the pinion axes from the horizontal to the vertical. The baskets have a plurality of rows of upright prongs, and the number of pinions in each group carried by the chute to loading position corresponds to the number of prongs in each basket row.

When the first row of prongs in the first empty basket reaches loading position, the basket conveyor is automatically stopped, and a group of pinions are fed to loading position, released from the lower end of the chute and positively moved onto the prongs. The basket conveyor is then restarted, moving the next row of prongs into loading position so that the next group of pinions may be loaded. The loaded baskets are carried to an inclined gravity conveyor from which they may be transported to the next operation.

Figure 1:
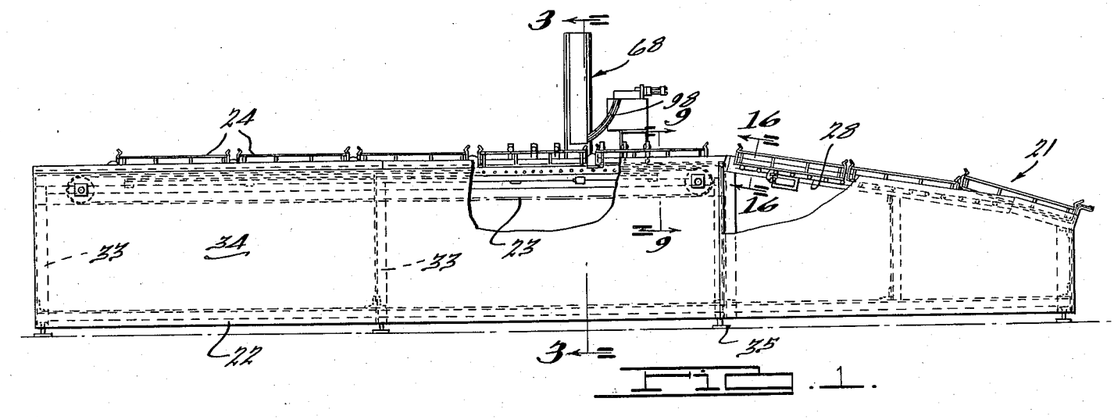
Figure 1 is a side elevational view of the automatic basket loader of this invention showing the path which the baskets follow in approaching and leaving the loading station.

Referring more particularly to the drawings, Figure 1 shows an overall view of the device which is generally indicated at 21 and comprises an elongated base 22 of a height convenient to an operator standing alongside the base. The main portion of base 22 is horizontal and an endless chain conveyor 23 is mounted on base 22 for conveying baskets 24 therealong. Conveyor 23 extends between two pairs of sprockets 25, seen best in Figure 2, the shaft 26 of the forward pair of sprockets being driven by a motor 27 mounted alongside base 22. Forwardly of chain conveyor 23, base 22 is inclined downwardly and has a gravity roller conveyor 28 mounted thereon which may receive baskets 24 from the chain conveyor.

Figure 2:
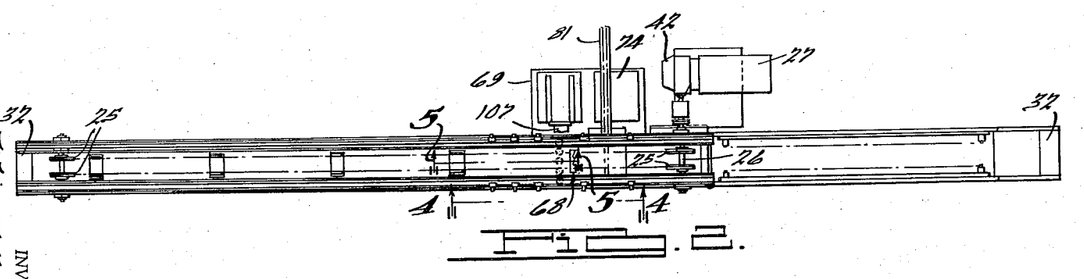
Figure 2 is a top plan view of the mechanism illustrated in Figure 1, parts being broken away, showing the relative locations of an inclined conveyor for feeding parts to the loader and the conveyor drive.

Considering base 22 in further detail, this comprises a pair of lower beams 29 spaced apart a distance approximately equal to the width of baskets 24, a pair of upper beams 31, and appropriate cross pieces 32 as seen in Figure 2. Posts 33 are provided at spaced intervals along the base as seen in Figure 1, and cover plates 34 are secured to the sides of base 22. A plurality of adjustable feet 35 are mounted at the bottom of base 22 for levelling purposes. Intermediate longitudinal beams 36 spaced below beams 31 are also provided in the base as seen in Figures 3 and 9.

Figure 3:
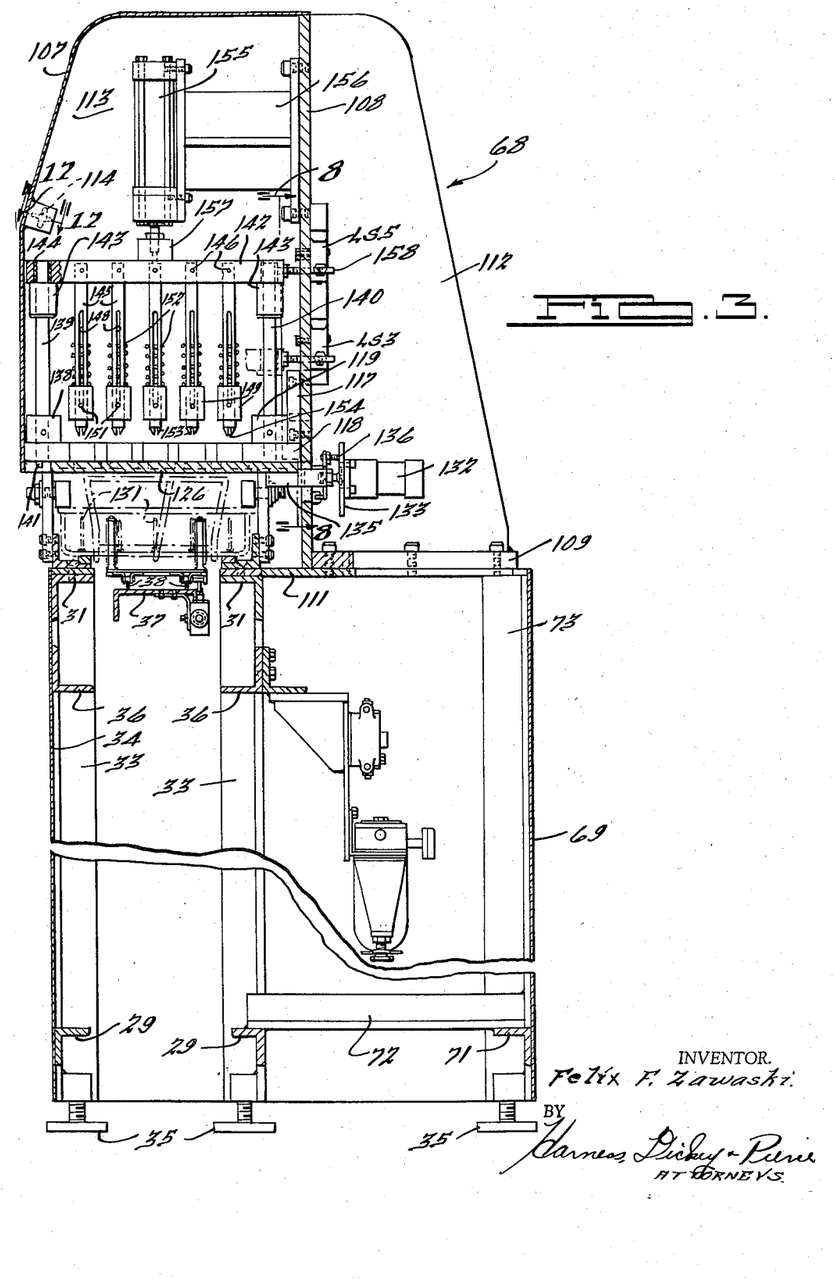
Figure 3 is a cross-sectional view in elevation taken along the line 3—3 of Figure 1 and showing the alignment pins and the manner in which the baskets are supported.
Figures 5, 6, 7:
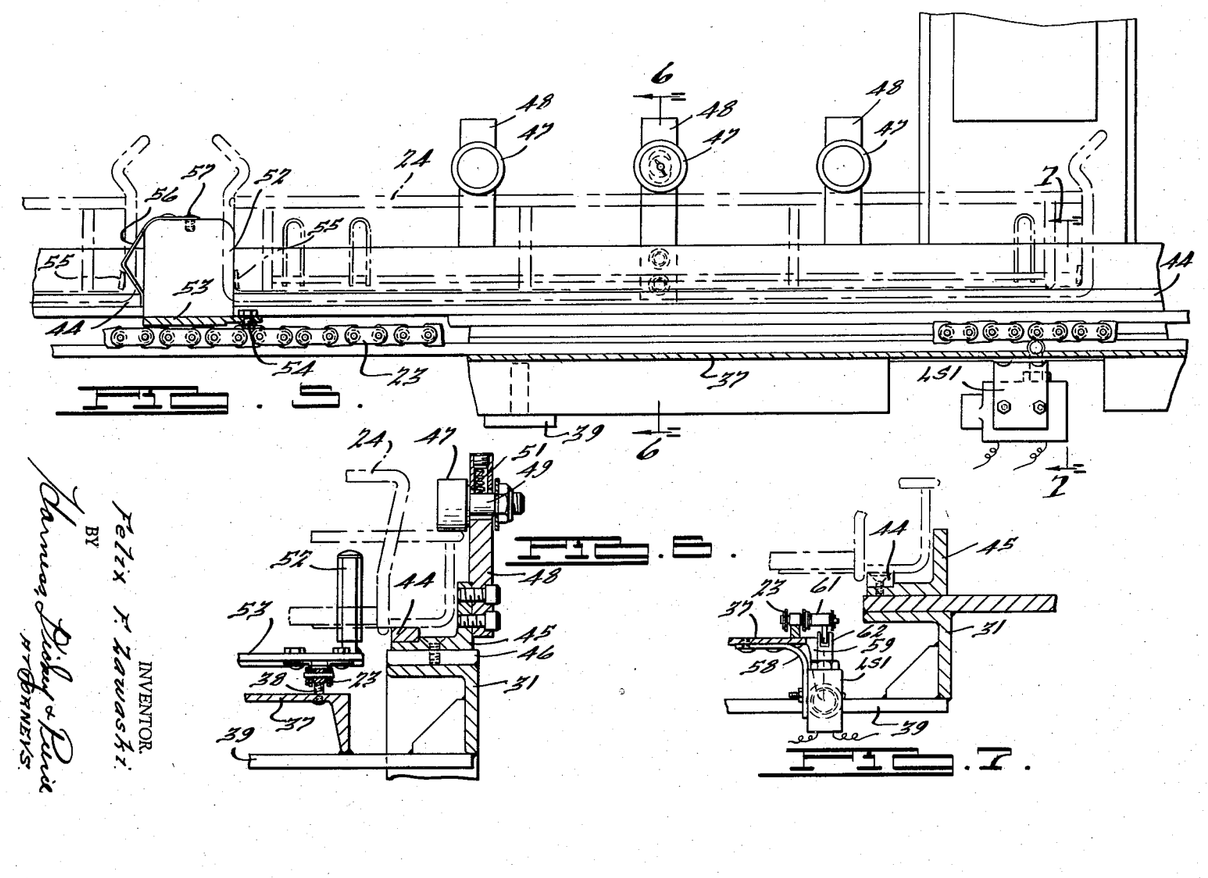
Figure 5 is an enlarged fragmentary side elevational view in cross section taken along the line 5—5 of Figure 2 and showing the means on the conveyor chain for transporting the baskets.
Figure 6 is a cross-sectional view in elevation taken along the line 6—6 of Figure 5 and showing the basket supporting means in further detail.
Figure 7 is a fragmentary cross-sectional view in elevation taken along the line 7—7 of Figure 5 and showing the manner in which a limit switch is engaged by a pin on the conveyor chain.

As seen best in Figures 3, 5 and 6, a channel-shaped conveyor supporting plate 37 is mounted between beams 31 and carries skids 38 for supporting the upper run of chain conveyor 23 which comprise two parallel endless chains. Plate 37 is supported by a plurality of cross braces 39 extending between beams 31, as seen in Figures 6 and 7. Sprockets 25 which support the ends of the chain conveyor are rotatably mounted between beams 31 and 36, Figure 9 illustrating in detail the manner in which the forward shaft 26 is supported. A pair of bearings 40 are secured between beams 31 and 36 on both sides of base 22, and shaft 26 is connected to a safety slip clutch 41 which in turn is driven by reduction gearing 42 connected to motor 27. A safety switch operator 43 is mounted adjacent slip clutch 41, this member operating a safety switch as will be later described.

Wire baskets 24 are slidably supported on base 22 by a pair of tracks 44 best seen in Figures 6 and 7, these tracks being spaced above and outwardly from chain conveyor 23. Tracks 44 are supported by stringers 45 mounted on beams 31, plates 46 being disposed between the stringers and beams. As seen in Figures 5 and 6, a plurality of roller guides 47 are mounted adjacent the loading station by means of uprights 48 secured to stringers 45, these rollers serving to hold down the baskets in a predetermined position while they are being loaded. Rollers 47 are mounted on stub shafts 49 which are urged by compression springs 51 in a downward direction, so that rollers 47 will engage the upper edges of baskets 24.

Means are mounted at spaced intervals along chain conveyor 23 for engaging baskets 24 for movement along tracks 44. This means includes a plurality of pairs of basket engaging plates 52 secured in upright position on members 53 which are secured to conveyor 23 by fasteners 54 in such a manner as to permit carriers 53 to travel around sprockets 25. Plates 52 are in planes parallel to the direction of movement of baskets 24 and are of a width sufficient to maintain the baskets in properly spaced position.

The forward and rear edges of plates 52 are adapted to engage cross bars 55 secured at the front and rear ends of each basket 24, as best seen in Figure 5. A V-shaped leaf spring 56 is secured to the rear end of each plate 52 by means of a bolt 57 at one end of the spring, these leaf springs engaging the forward bars 55 of the baskets in such a manner as to maintain firm engagement of the baskets with tracks 44. It will be noted that basket engaging plates 52 are disposed inwardly of tracks 44 so that no interference will occur between the conveyor and tracks.

Figures 12, 13, 14:
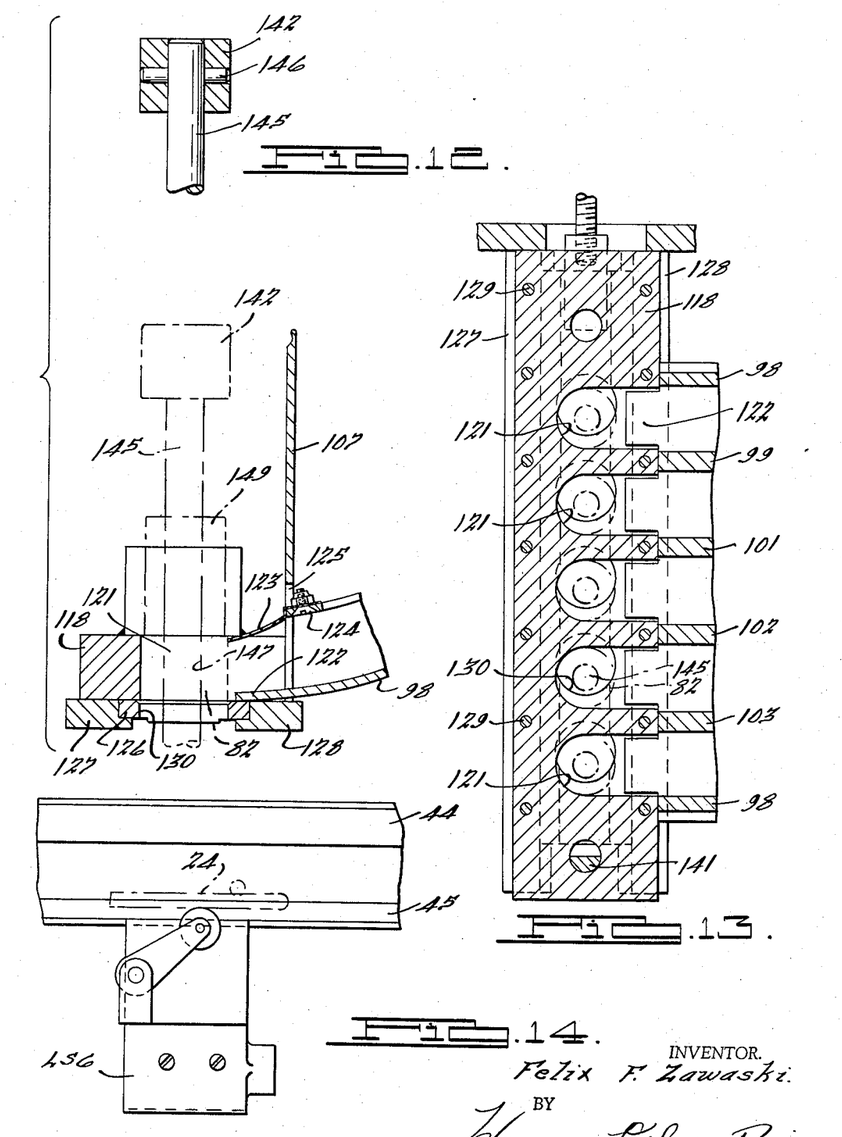
Figure 12 is a fragmentary elevational view in cross section taken along the line 12—12 of Figure 11 and showing the manner in which workpieces are retained in the lower end of the chute.
Figure 13 is a fragmentary plan view taken along the line 13—13 of Figure 4 and showing the compartments at the lower end of the chute for receiving the workpieces as well as the chute escapement plate.
Figure 14 is a fragmentary plan view in cross section taken along the line 14—14 of Figure 4 and showing a limit switch engageable by the side of the basket when it reaches the loading station.
Figure 15:
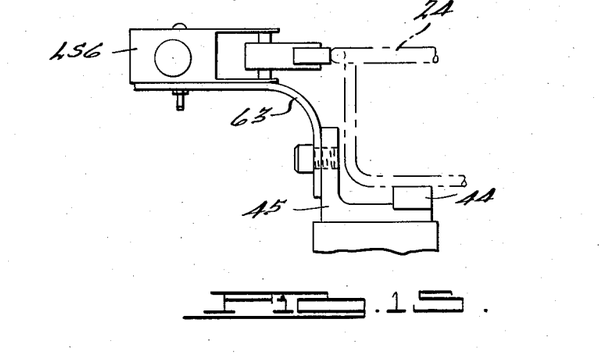
Figure 15 is an end elevational view of the structure shown in Figure 14.

Figures 7, 14 and 15 illustrate the manner in which limit switches may be mounted adjacent baskets 24 and conveyor 23 so as to be actuated during movement of these parts. More specifically, Figure 7 illustrates a limit switch LS1 mounted on a bracket 58 secured below bed plate 37, the switch being located in a cut-out 59 of the bed plate flange. A switch actuator 61 in the form of an outwardly extending pin secured to conveyor 23 is adapted to engage an arm 62 projecting outwardly from switch LS1 when pin 61 reaches a predetermined position. As will be later described, limit switch LS1 serves to halt conveyor 23 as each row of basket prongs reaches loading position, and sufficient pins 61 are therefore provided on conveyor 23 to correspond to the rows of basket prongs to be loaded. In Figures 14 and 15, a switch LS6 is shown which is mounted on a stringer 45 by means of a bracket 63, switch LS6 being engaged by each basket 24 as it reaches loading position. The purpose of switch LS6, as will be further described below, is to halt the operation when no basket is in the loading position.

Figures 16, 17:
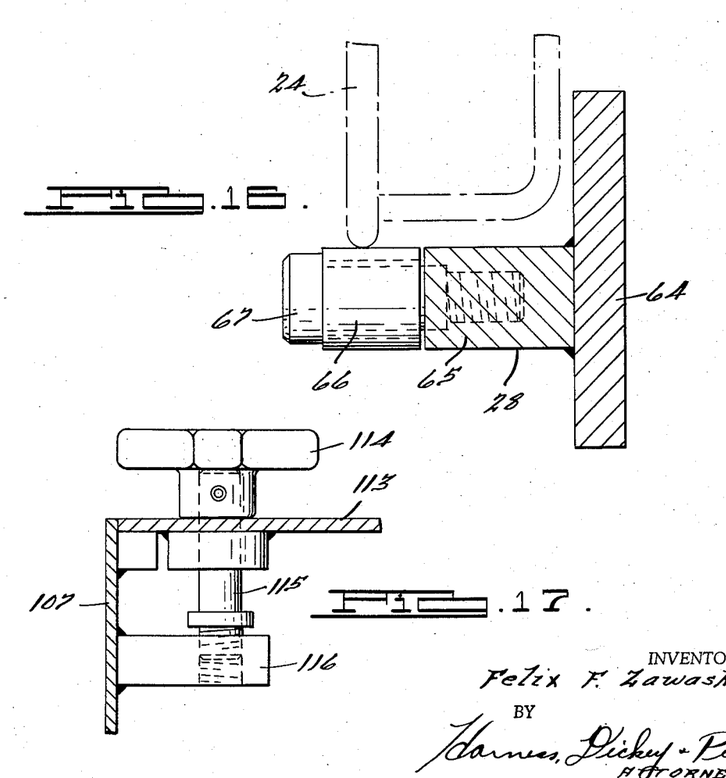
Figure 16 is a fragmentary elevational view in cross section taken along the line 16—16 of Figure 1 and showing a roller on the inclined portion of the basket conveyor which receives the loaded baskets.
Figure 17 is a fragmentary plan view in cross section taken along the line 17—17 of Figure 3 and showing the means for fastening the cover plate on the alignment pin housing.

The construction of inclined gravity conveyor 28 is illustrated in Figure 16, this portion of the unit comprising a pair of longitudinal guide members 64, carrying inwardly projecting roller carriers 65. Mounted inwardly of carriers 65 are a plurality of rollers 66 supported on pins 67 which are threaded into carriers 65. Rollers 66 are adapted to support fully loaded baskets 24 so that these baskets may roll downwardly and to the right as shown in Figure 1 after they have left the loading station.

The position of the loading station, generally indicated at 68, is best seen in Figures 1 and 2. This position is a short distance rearwardly of the forward end of conveyor 23. The components of loading station 68 function to sort the workpieces in groups corresponding in number to the number of prongs in each basket row, the illustrated embodiment having five workpieces in each group. The loading station elements perform the further function of re-orienting the axes of each group of workpieces from the horizontal to the vertical, and causing each group of re-oriented parts to be simultaneously loaded onto the basket prongs.

Figures 8, 10:
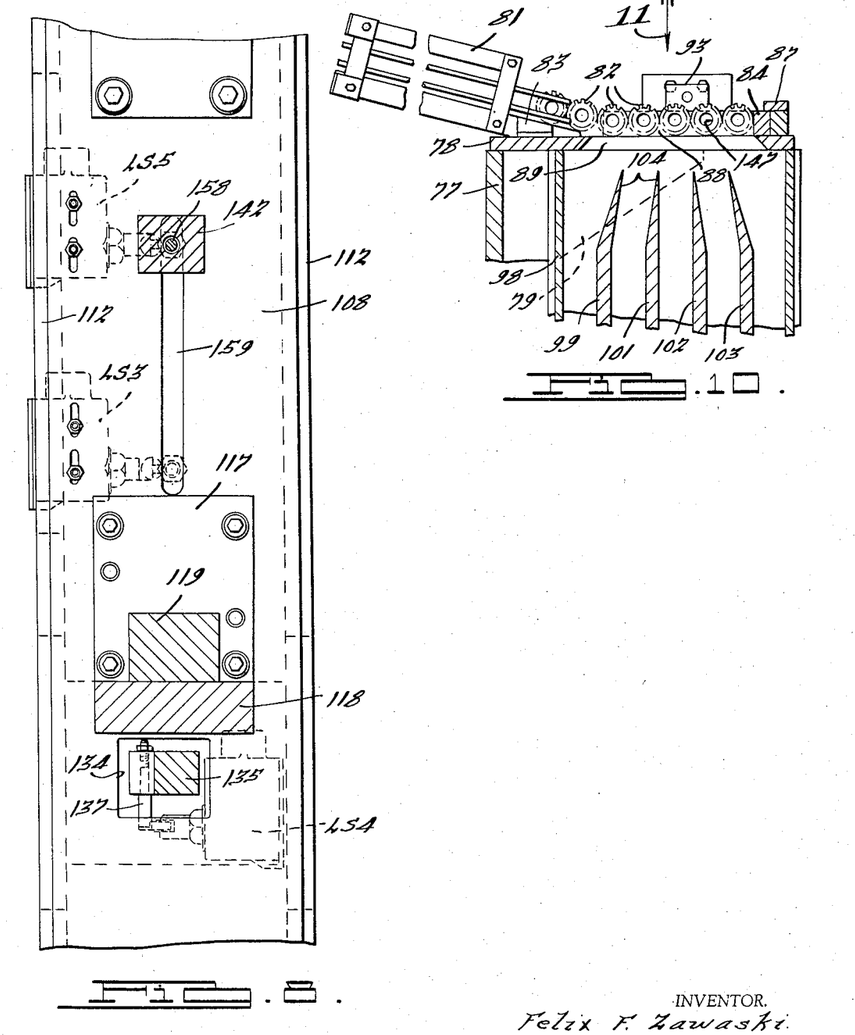
Figure 8 is a fragmentary elevational view in cross section taken along the line 8—8 of Figure 3 and showing limit switches engaged by vertical movement of the alignment pin support.
Figure 10 is a fragmentary cross-sectional view in elevation taken along the line 10—10 of Figure 4 and showing the entrance portion of the chute and the guide partitions therein.
Figure 11:
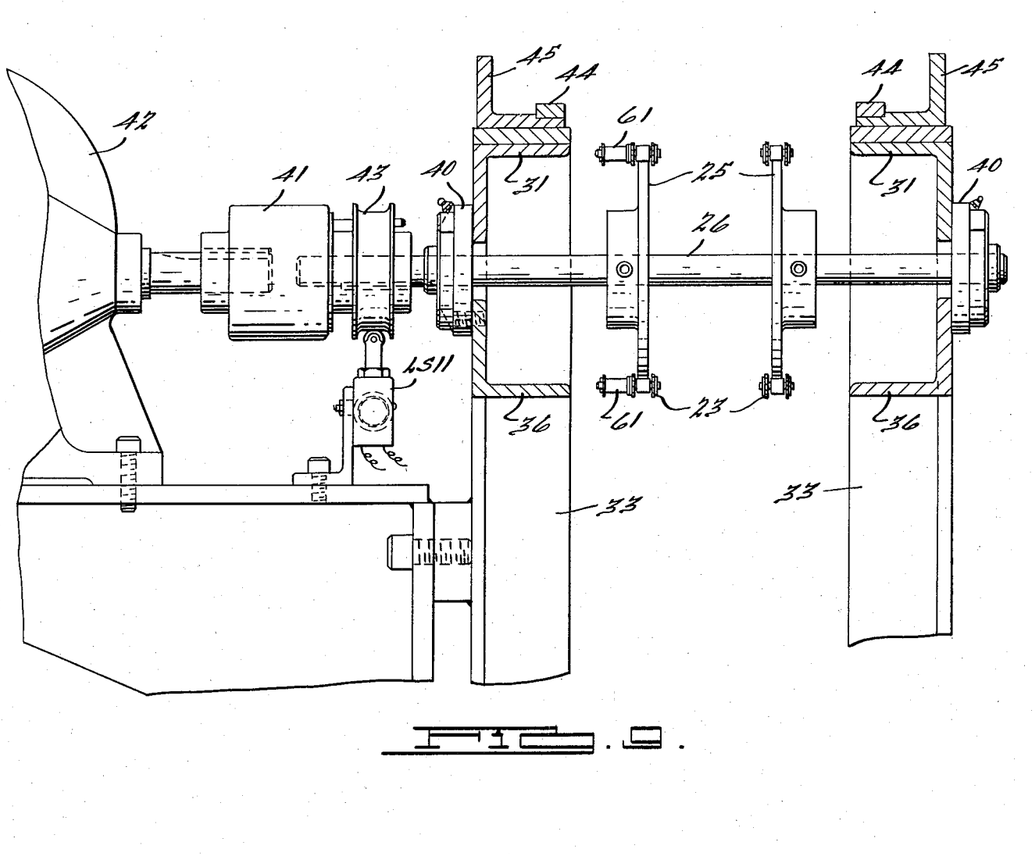
Figure 11 is a fragmentary top plan view taken in the direction of the arrow 11 of Figure 10 and showing the parts conveyor escapement mechanism.

As seen best in Figure 3, loading station 68 is supported by a lateral extension 69 of base 22, this base extension having appropriate beams 71, cross braces 72 and posts 73. A plate 74 on base extension 69 supports a framework comprising a pair of upright plates 75 and 76 and a connecting plate 77, as best seen in Figure 11. Projecting from the upper end of this framework and suspended over base 22 is a platform 78, this platform having a supporting bracket 79 as seen in Figure 10. An inclined gravity conveyor 81 extends laterally towards loader 21 with the lower end of conveyor 81 resting on platform 78. Conveyor 81 serves to carry the workpieces such as center-bored gears 82 from the previous operation, and the gears may be loaded onto the upper end (not shown) of conveyor 81 by any appropriate means such as a power-actuated elevator. The axes of gears 82 are horizontal when travelling on conveyor 81, and the gears will be fed in succession onto the central portion of platform 78, the lower end of conveyor 81 being secured to the platform by brackets 83.

Slidably supported by platform 78 is a conveyor escapement plate 84, seen best in Figures 10 and 11. This plate is somewhat smaller than platform 78 and rests on that portion of the platform which overlies base 22. Plate 84 is supported for movement in a direction parallel to the extent of base 22, being guided by a plurality of guides 85, 86 and 87 secured to platform 78 and engageable with the opposite edges of plate 84. A slot 88 is provided in plate 84, this slot being of a width slightly larger than that of gears 82 and of sufficient length to receive five of these gears simultaneously, as shown in Figure 10. An elongated aperture 89 is provided in platform 78, this aperture being of sufficient length and width to receive five gears simultaneously.

Plate 84 is movable between a receiving position shown in Figure 11, in which slot 88 is aligned with conveyor 81, and a releasing position in which slot 88 is aligned with aperture 89 so that the five gears held by slot 88 will drop into aperture 89. The means for moving conveyor escapement plate 84 between its said positions comprises a double-acting cylinder 91 secured to a supporting plate 92 mounted adjacent platform 78, the piston rod of cylinder 91 being connected to plate 84 by a post 93 as seen in Figure 11. The movement of plate 84 is limited in one direction by a pair of stops 94 mounted on supporting plate 92 and in the other direction by a pair of stops 95 mounted on brackets 96 secured to platform 78. A limit switch LS2 is mounted between stops 95 by means of a bracket 97, this switch being actuated by arrival of plate 84 at its releasing position. The purpose of limit switch LS2 is to actuate the alignment pins which urge gears 82 toward the basket prongs, as will later appear.

An enclosed chute 98 extends from the underside of aperture 89 in a curved manner for guiding each group of gears 82 as they are dropped through platform 78 toward the loading position. Chute 98 has a configuration best seen in Figures 1 and 4, and contains four interior partitions 99, 101, 102 and 103 as seen in Figure 10. The purpose of these partitions is to separate and guide the five gears in each group so that they will arrive in proper loading position. For this purpose the upper ends 104 of the partitions are tapered as shown in Figure 10, and partitions 99 and 103 flare in opposite directions so as to provide proper spacing for the gears, partitions 101 and 102 flaring to a somewhat lesser extent. The spaces between these partitions are located directly below the locations of the gears before they are dropped through aperture 89, so that the gears will drop without interference through the chute. The depth or thickness of chute 98 is such that the gears may follow a curved path, arriving finally in a vertical-axis position.

Figure 4:
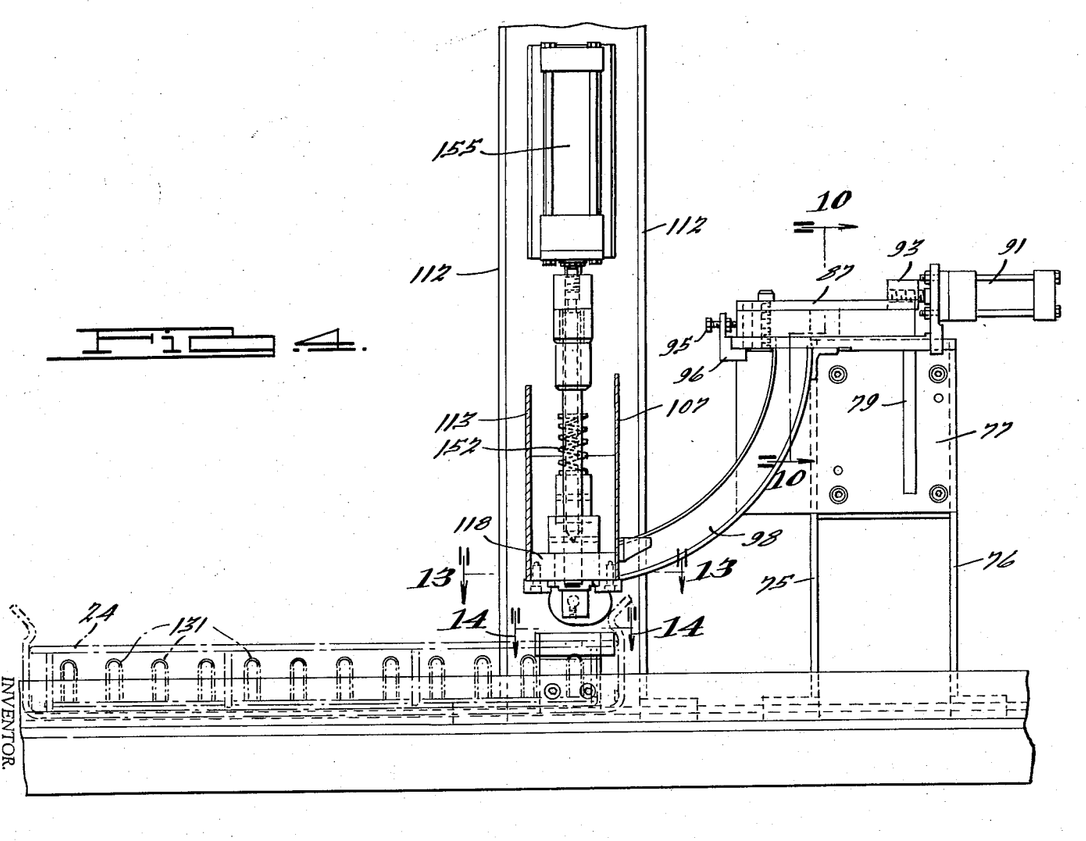
Figure 4 is an enlarged fragmentary side elevational view taken along the line 4—4 of Figure 2 and showing the configuration of the curved chute.

The lower end of chute 98 is secured by flanges 105 and bolts 106 to the lower portion of an alignment pin housing 107, as seen in Figures 4 and 11. This housing is of elongated shape in a direction transverse to the direction of movement of baskets 24 and extends a substantial distance above conveyor 23, the housing being open at its lower end. Housing 107 is supported by a plate 108 which is secured in upright position alongside and parallel to base 22 by means of a plate 109 which rests on a platform 111, the latter platform surmounting base extension 69 as seen in Figure 3. A pair of upright plates 112 are mounted on plate 109 and secured to plate 108 so as to form a rigid supporting structure for housing 107 and its associated parts. One side plate 113 of housing 107 may be removable by means of a plurality of hand wheels 114 having threaded shafts 115 engageable with lugs 116 fixed within the housing, as shown in Figures 3 and 17.

Secured to the lower end of plate 108 facing conveyor 23 is a supporting plate 117, and an elongated workpiece positioning block 118 is secured to plate 117, a guide pin supporting block 119 being disposed between and secured to plate 117 and block 118, as seen in Figures 3 and 8. Block 118 is of a thickness approximately equal to that of gears 82 and extends across base 22 above the path of baskets 24. Block 118 is provided with five semi-circular recesses 121, seen best in Figure 13, these recesses opening toward and being aligned with the spaces formed by partitions 99 to 103 within chute 98. As seen best in Figure 12, the lower end of chute 98 has a plurality of lower lips 122 which enter into recesses 121 so that gears dropping through chute 98 may be carried to a position of rest within the semi-circular recesses, the diameter of these recesses being approximately equal to that of the gears. An upper retaining lip 123 of thin spring-like material may be secured by bolts 124 to the upper edge of the mouth of chute 98, the configuration of this retaining lip being such that it will yield as each group of gears exits from the chute and will snap into position behind the gears to lock them in place in recesses 121. The clearance aperture 125 provided in the lower end of housing 107 for chute 98 is preferably made of sufficient size to accommodate the parts described above.

Slidably mounted on the underside of positioning block 118 is a chute escapement plate 126, this plate being slidably supported by brackets 127 and 128 which are secured to the underside of block 118 by bolts 129, as seen in Figures 12 and 13. Plate 126 is provided with a plurality of apertures 130 of a diameter slightly larger than that of gears 82. The chute escapement plate is movable between a holding position in which apertures 130 are out of register with recesses 121 and a releasing position in which these apertures are aligned with their respective recesses. The releasing position of plate 126 is such that apertures 130 will be concentric with a row of prongs 131 of baskets 24 which are in loading position. It will be noted that when plate 126 is in its holding position, end portions of apertures 130 will be aligned with the central portions of recesses 121, so that alignment pins may pass through plate 126 as described below.

The means for actuating chute escapement plate 126 comprises a double acting cylinder 132, seen best in Figure 3. This cylinder is mounted on a plate 133 which extends laterally from one of plates 112, and the cylinder is aligned with a clearance aperture 134 in plate 108. The piston rod of cylinder 132 is connected by a member 135 to one end of chute escapement plate 126. The holding position of plate 126 is determined by an adjustable set screw 136 as seen in Figure 3, this set screw being mounted on member 135 and being engageable with plate 133. Also secured to member 135 is a switch actuator 137, seen best in Figure 8, this actuator being engageable with a limit switch LS4 when chute escapement plate 126 reaches its releasing position. As will be later described, switch LS4 serves to cause return movement of plate 126 to its holding position as well as retracting movement of the alignment pins after they have forced pinions 82 through apertures 130 in the chute escapement plate.

The outer end of block 118 carries a guide pin supporting block 138 similar to block 119. A pair of guide pins 139 and 140 are secured to blocks 138 and 119 respectively and extend upwardly therefrom, as seen in Figure 3. The lower end of guide pin 139 has an extension 141, as seen best in Figures 3 and 13. This extension serves to limit the movement of chute escapement plate 126 as it reaches its releasing position. The upper ends of guide pins 139 and 140 serve to guide an alignment pin supporting bar 142 as seen in Figure 3.

A pair of guide sleeves 143 are secured to the underside of bar 142, and pins 139 and 140 extend through these sleeves and through bushings 144 carried by bar 142. The alignment pin support is of rectangular cross section, as shown in Figure 8, and carries five alignment pins 145 in suspended fashion. These pins may be suitably supported by fasteners 146, as shown in Figure 3, in such a manner that they depend below bar 142 and are axially aligned with the circular portions of recesses 121 in block 118. The diameter of each pin 145 is such that it may enter the center bore 147 of a pinion 82 retained in the corresponding recess 121, and may also pass through the aligned end portion of an aperture 130 when chute escapement plate 126 is in its holding position. Axial slots 148 are provided in pins 145, and collars 149 are mounted on the pins, these collars carrying transverse pins 151 which pass through slots 148. The diameters of collars 149 are such that they may enter into recesses 121 while engaging pinions 82 which are disposed therein. Disposed above each collar 149 is a coil spring 152 which rests on the upper end of its corresponding collar, the upper end of each spring 152 being adapted to be engaged by the underside of bar 142 when this bar is moved downwardly while collars 149 are held against movement by the pinions 82 which they engage. The lower ends 153 of pins 145 are tapered so as to be enterable into bores 147 of pinions 82, and slots 154 are provided in these tapered tips for engaging prongs 131 of baskets 24 which, as seen in Figure 4, are formed of looped wires.

The movement of alignment pin support 142 is controlled by a double acting cylinder 155 which is mounted on a bracket 156 secured to plate 108 in the upper portion of housing 107. The piston rod of cylinder 155 is secured to the central portion of bar 142 by means of a block 157. The upper limit of movement of bar 142 will be determined by the position of the piston within cylinder 155, whereas the lower position of the bar will be limited by engagement of rods 145 with basket prongs 131.

Projecting outwardly from bar 142 is a limit switch actuator 158, seen best in Figures 3 and 8, which projects through a slot 159 in plate 108. As bar 142 reaches its lower position it will engage a limit switch LS3, this switch controlling movement of chute escapement plate 126 to its releasing position as described below. When bar 142 reaches its upper position, actuator 158 will engage a limit switch LS5 which will start actuation of conveyor motor 42 so that the succeeding row of prongs 131 may be moved into loading position.

The schematic circuit diagram of Figure 18 shows a suitable arrangement for the electrical power and control circuits which enable the basket loader to be automatically operated. The diagram shows a three-phase power supply having conduits L1, L2 and L3 controlled by a master switch 160 and supplying power to basket conveyor motor 27 as well as an elevator motor 161 which carries parts to the top of inclined gravity conveyor 81. A normally open solenoid-operated switch 1M is provided in the circuit of motor 27 and a similar switch 2M controls energization of motor 161. A transformer 162 the primary of which is connected across two conduits of the supply line serves to supply power to the various relays and solenoids in the control circuit. A conduit 163 connected to one side of the secondary coil of transformer 162 supplies current to three branch lines 164, 165 and 166, the other sides of these branch lines being connected to transformer 162 by a conduit 167. Line 164 has a solenoid A which when energized operates a valve 168 which controls conveyor escapement cylinder 91, causing escapement plate 84 to move to its releasing position. The details of construction of valve 168 as well as the hydraulic circuits controlling this and other cylinders of loader 21 are not illustrated, conventional constructions being used for this purpose. Line 165 has a solenoid B which when energized operates a valve 169 controlling alignment pin operating cylinder 155. With solenoid B energized, the piston rod of cylinder 155 will be extended to move alignment pins 145 to their lower position, while de-energization of solenoid B will cause cylinder 155 to retract the alignment pins. Line 166 has a solenoid C which controls a valve 171, this valve being in the hydraulic circuit of chute escapement cylinder 132. With solenoid C energized, cylinder 132 will be operated to cause movement of escapement plate 126 to its releasing position, while de-energization of solenoid C will cause plate 126 to move to its holding position. In parallel with solenoid C is a solenoid D which, like solenoid A, is connected to valve 168 controlling conveyor escapement cylinder 91. Energization of solenoid D will urge valve 168 to a position causing movement of conveyor escapement plate 84 to its retracted or workpiece receiving position.

Likewise connected to the secondary of transformer 162 is a conduit 172 which has a start switch 173 and a stop switch 174. A control relay CR1 is in series with conduit 172, this relay having a pair of holding contacts connected across start switch 173. A conduit 175 connected to conduit 172 leads to a conduit 176 in series with an indicating light 177. A conduit 178 connects conduit 177 to transformer 162 so that light 177 will be energized whenever the machine is running. Conduit 175 is also connected to a conduit 179, and lines 181, 182, 183, 184, 185, 186, 187 and 188 are connected across conduits 179 and 178.

In series with conduit 181 is a control relay CR2 having normally open contacts in line 164 and normally closed contacts in line 182. Also in series with line 181 is limit switch LS1 which, as noted previously, is closed by the arrival of each pin 61 at this switch, thus signalling the arrival of another empty row of basket prongs in loading position. A safety limit switch LS6 is likewise in series with line 181, this switch being disengaged when no basket is in loading position, thus insuring against faulty operation should LS1 be tripped with no basket at the loading station.

Connected to line 181 is a branch line 189 which has a timing relay TR2, this timing relay having normally closed contacts in series with line 181, which contacts are opened instantaneously when TR2 is energized. TR2 likewise has normally closed contacts in line 188, these contacts being opened after a 5 to 10 second time delay when TR2 is energized to cause retraction of alignment pins 145 and chute escapement plate 126. Also in line 189 is limit switch LS4 which is closed by actuator 137 upon arrival of chute escapement plate 126 at its releasing position. TR2 also has a pair of normally open contacts connected across LS4, these contacts being closable instantaneously when TR2 is energized.

Motor starter relay 1M is connected in line 182 and controls the normally open switches in the circuit of motor 27. Limit switch LS5 is also in line 182, this switch being closable by arrival of alignment pin support 142 in its upper position.

A timing relay TR3 is in circuit with line 183, this relay having normally open contacts in line 182 which close after a time delay when TR3 is energized. Also in line 183 is a limit switch LS7 which has a safety function, this switch being opened by a pin (not shown) located below the inclined portion 28 of the conveyor. Switch LS7 is normally closed but will be opened when three loaded baskets are present on inclined conveyor 28, thus occupying the full extent of this inclined conveyor as seen in Figure 1. TR3 will thus be deenergized to stop basket conveyor motor 27 when loaded baskets are not being removed from the unit. Also in line 183 is a safety limit switch LS9 which is held in closed position by a workpiece 82 at the lower end of gravity conveyor 81.

In line 184 is a trouble light 191 which will glow when some fault occurs in the operation. In series with light 191 is a limit switch LS8 which is normally open and will be actuated by spillage of the elevator clutch (not shown) driven by motor 161, indicating a blockage at the elevator. In parallel with switch LS8 is a normally open limit switch LS11 seen in Figure 9. This switch will be actuated by slippage of safety clutch 41 when a blockage occurs on conveyor 23. TR3 also has contacts in parallel with switches LS8 and LS11, these contacts being open when TR3 is energized and closed after a time delay when TR3 is de-energized.

A timing relay TR4 is in line 185, this relay being controlled by a limit switch LS10. LS10 is normally closed and will be opened by the presence of a workpiece at the upper level of the elevator (not shown) which delivers parts to the upper end of chute 81. TR4 has normally open contacts in line 186, these contacts being closed when TR4 is energized, that is, when LS10 is closed by the absence of a part at the upper end of the elevator. The contacts of TR4 will open when TR4 is de-energized. These contacts control relay 2M which operates the elevator motor switch, so that the elevator will be operated as parts are removed from the upper end of the elevator.

A timing relay TR1 is in line 187, energization of this relay being controlled by a limit switch LS2, seen in Figure 11, LS2 is normally open and is closed when conveyor escapement plate 84 is moved to its releasing position. Energization of TR1 closes a pair of contacts in a branch line 192 connected between line 187 and line 178 with a time delay of 5 to 10 seconds. A control relay CR3 is in line 192 and has normally open contacts in series with solenoid B which controls alignment pin cylinder 155. It will thus be seen that release of workpieces 82 into chute 98 will cause downward movement of alignment pins 145 after a delay sufficient to enable the workpieces to arrive in their loading position within recesses 121.

Line 188 has a limit switch LS3, seen in Figure 3, which is closed by arrival of alignment pin support 142 at the downward end of its stroke. This switch controls energization of a control relay CR4 the contacts of which are in series with solenoids C and D. It will be recalled that solenoid C controls chute escapement cylinder 132 while solenoid D urges valve 186 toward a position which will cause retracting movement of conveyor escapement cylinder 191. CR4 also has holding contacts in parallel with LS3, the normally closed contacts of TR2 being in series with these elements.

*Operation*

Assuming an initial condition in which gears 82 occupy conveyor 81 and slot 88 of conveyor escapement plate 84, an operator standing alongside machine 21 will load baskets 24 onto conveyor 23 between basket-engaging plates 52. Manual start button 173 will be pushed, energizing CR1 to close the holding circuit across the start button and energizing running light 177. TR3 will be energized, assuming that safety switch LS7 on inclined conveyor 28 is closed and that safety switch LS9 is closed by a part 82 at the lower end of conveyor 81. This will mean that contacts TR3 in line 182 will be closed. Since LS1 is open with no basket yet in loading position, CR2 will be de-energized, closing contacts CR2 in line 182. LS5 will be closed since alignment pin support 142 is in its upper position. Motor relay 1M will therefore be energized, closing the circuit to basket conveyor motor 27.

The baskets loaded onto conveyor 23 by the operator will thus move along until a pin 61 on conveyor 23 engages and closes LS1. This will energize CR2, opening the CR2 contacts in line 182 and de-energizing motor relay 1M, thus stopping basket conveyor motor 27 with the first row of basket prongs 131 in loading position. Simultaneously, the CR2 contacts in line 164 will be closed, energizing solenoid A. This will shift valve 168 to a position in which conveyor escapement plate 84 will be moved to its releasing position by cylinder 91.

When plate 84 reaches its releasing position, the five gears 82 held in slot 88 of the plate will drop through aperture 89 into chute 98, being separated into five separate channels by partitions 99 to 103 within the chute. The parts will slide down through the curved chute until they reach their final position within recesses 121 in block 118. Arrival of escapement plate 84 in its releasing position will also close LS2 which will energize TR1. This will cause energization of CR3 after a time delay of five to ten seconds. Energization of CR3 will close the circuit to solenoid B, thus shifting valve 169 and causing downward movement of alignment pin support 142 and the five alignment pins 145 suspended therefrom.

As the alignment pins are forced down they will enter the bores of gears 82 and will pass through end portions of apertures 130 in chute escapement plate 126 which are at this time partially misaligned with recesses 121 as seen in Figure 13. Pins 145 will come to rest when slots 154 thereof engage basket prongs 131 in loading position. Collars 149 however will engage the upper surfaces of gears 82, the collars coming to rest in the position shown in dot-dash lines in Figure 12, with springs 152 compressed between these collars and support 142 which is likewise shown in dot-dash lines in this figure.

This movement of support 142 will cause opening of LS5 and closure of LS3. CR4 will be energized, thus closing the circuit to solenoid C which will shift valve 171 to cause movement of chute escapement plate 126 to releasing position by means of cylinder 132. As apertures 130 are shifted into alignment with recesses 121, gears 82 will be forced down onto prongs 131 by collars 149 which are urged downwardly by springs 152. Closure of CR4 contacts will also energize solenoid D, but since solenoid A is still energized, conveyor escapement plate 84 will remain in its releasing position.

As chute escapement plate 126 reaches its releasing position, pin 137 will close LS4, energizing TR2. The TR2 contacts in line 181 will open, de-energizing CR2. This will cause closure of the CR2 contacts in line 182. The CR2 contacts in the circuit of solenoid A will open, permitting energized solenoid D to cause return of conveyor escapement plate 84 to its receiving position in which slot 88 is aligned with conveyor 81 to receive the next group of five gears 82.

As conveyor escapement plate 84 leaves its releasing position, it will allow LS2 to open, thus de-energizing TR1. Opening of the TR1 contacts in line 192 will de-energize CR3 causing a shift of solenoid B which will result in alignment pin support 142 being lifted to its upper position by cylinder 155.

Energization of TR2 will also cause opening of the TR2 contacts in line 188 after a time delay of about five to ten seconds. This will de-energize CR4 which will open the circuit to solenoid C, shifting valve 171 to a position permitting return of chute escapement plate 126 to its retracted position. Solenoid D will also be de-energized when the CR4 contacts are opened, but conveyor escapement plate 84 will have already returned to its receiving position.

As alignment pin support 142 reaches its upper position, pin 158 will close LS5. Since the CR2 contacts in line 182 will have previously been closed, motor relay 1M will be energized, closing the circuit to basket conveyor motor 27. As pin 61 leaves LS1, the latter will open. This will prevent premature energization of CR2 which might otherwise occur by closure of the TR2 contacts in line 181. (These contacts are closed due to de-energization of TR2 when chute escapement plate 126 is moved to its retracted position, opening LS4.) When the next row of prongs 131 arrives in loading position, the next pin 61 on conveyor 23 will again close LS1, starting a new cycle.

It will thus be seen that a highly efficient loading machine has been provided which will automatically load a group of workpieces simultaneously, and in which successive groups may be rapidly loaded into a basket in an ordered sequence without minimum attention from an operator. The movements of the parts are positively controlled and directed at all times, thus insuring accurate alignment of the workpieces with the basket prongs and providing sufficient force so that the parts may be firmly positioned in the baskets.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a device for automatically loading successive groups of parts into baskets having a plurality of rows of parts receiving positions, an elongated base, a basket conveyor on said base, means for advancing said conveyor, a loading station adjacent one end of said conveyor, means responsive to the arrival of a first parts receiving row of one of said baskets at said loading station for stopping said conveyor, a parts positioner at said loading station having a plurality of recesses corresponding to the number of parts holding positions in a single basket row for holding parts in loading position, a chute adjacent said loading station, a parts conveyor for feeding parts to the upper end of said chute, a conveyor escapement member movable between a receiving position and a releasing position, said conveyor escapement member when in its receiving position being adapted to receive a single group of parts from said parts conveyor and when in its releasing position being adapted to simultaneously drop said parts into said chute, the lower end of said chute being adapted to guide said parts into said positioner, means responsive to arrival of a first row of parts receiving positions at said loading station for moving said parts conveyor escapement member to releasing position, means actuatable after said parts have reached said positioner for urging said parts toward said basket row, a chute escapement member movable between a retracted position retaining said parts in said positioner and a releasing position permitting said urging means to force said parts into said basket row, means responsive to arrival of said urging means in its urging position for causing said chute escapement member to move to its releasing position, and means responsive to arrival of said chute escapement member at its releasing position for causing said urging means to be retracted, said conveyor escapement member to move to its receiving position, said chute escapement member to move to its retracted position, and said basket conveyor to advance.

2. In a device for automatically loading groups of center-bored parts into baskets having a plurality of rows of prongs for receiving said parts, an elongated base, a basket conveyor on said base, a loading station adjacent one end of said basket conveyor, a parts conveyor for carrying successive parts to a point above said basket conveyor, a chute having its upper end adjacent the lower end of said parts conveyor and its lower end adjacent said loading station, a conveyor escapement member movable between a receiving position in which it may receive a group of parts from said parts conveyor and a releasing position in which said group of parts is released into the upper end of said chute, a positioning block at said loading station for receiving said group of parts from said chute and positioning said parts above a row of basket prongs in loading position, a plurality of alignment pins supported above said positioning block, said alignment pins being movable between an upper retracted position and a lower position in which said alignment pins project through parts in said positioning block, means at the lower end of said alignment pins for engaging said prongs, means on said alignment pins for urging said parts downwardly, said urging means being operative when said alignment pins are moved to their lower positions, and a chute escapement member movable between a retaining position in which said parts are retained in said positioning block and a releasing position in which said parts are permitted to be forced down said alignment pins by said urging means onto said basket prongs.

3. The combination according to claim 2, further provided with means responsive to arrival of a first row of basket prongs in loading position for moving said conveyor escapement member to its releasing position, delayed action means responsive to arrival of said conveyor escapement member at its releasing position for moving said alignment pins to their lower position, means responsive to arrival of said alignment pins at their lower position for moving said chute escapement member to its releasing position, and means responsive to arrival of said chute escapement member at its releasing position for retracting said alignment pins, moving said conveyor escapement member to its receiving position, moving said chute escapement member to its retaining position, and advancing said basket conveyor.

4. In a device for automatically loading groups of circular parts into baskets having a plurality of rows of parts receiving positions, an elongated base, a basket conveyor on said base, a loading station adjacent one end of said basket conveyor, an inclined parts conveyor above said basket conveyor for guiding circular parts in succession, a curved chute having a width sufficient to accommodate a group of parts which are aligned transversely to the direction of movement of said basket conveyor, means for simultaneously releasing a group of parts into the upper end of said chute, means adjacent the lower end of said chute for positioning said group of parts in loading position, a plurality of aligning and urging means supported above said positioning means, said aligning and urging means being movable between an upper retracted position and a lower position aligning said parts with a row of parts receiving positions in a basket and simultaneously urging said parts toward said basket row, a chute escapement member movable between a retracted position retaining said parts in said positioning member and a releasing position permitting said urging means to force said parts into said basket, and means responsive to movement of said chute escapement member to its releasing position for retracting said aligning and urging means and causing advancement of said basket conveyor.

5. In a device for automatically loading groups of parts in successive container rows, an elongated base, a container conveyor on said base, a loading station adjacent one end of said conveyor, means for intermittently moving said conveyor to bring successive container rows to said loading station, a parts positioner at said loading station having a plurality of recesses for positioning a group of parts in a row above a container row at said loading station, a curved chute having an upwardly facing entrance and an exit facing said parts positioner, said chute being of sufficient width to carry a group of parts simultaneously toward said recesses, means for simultaneously releasing a group of parts onto a container row below said recesses, an inclined parts conveyor above said base having an exit adjacent the entrance of said chute, a conveyor escapement plate slidably mounted adjacent said parts conveyor exit, a slot in said plate of sufficient length to receive a group of parts, and means for moving said plate between a receiving position in which said slot is aligned with said parts conveyor exit and a releasing position in which said slot is aligned with said chute entrance.

6. The combination according to claim 5, said chute curving through approximately ninety degrees whereby the axes of parts passing through said chute will be reoriented from the horizontal to the vertical.

7. The combination according to claim 5, said parts positioning recesses being semi-circular and opening toward the exit of said chute, and a plurality of partitions within said chute, said partitions being flared whereby a group of parts entering said chute will be separately channeled toward said recesses.

8. The combination according to claim 5, the positioning recesses at said loading station being adapted to position a group of circular parts with vertically oriented axes, the means for releasing said parts onto a container row comprising a chute escapement plate movable between a retracted position holding said parts in said recesses and a releasing position permitting said parts to drop, a plurality of urging members disposed above said retaining recesses, and means for moving said urging members between an upper retracted position and a lower position urging said parts toward said container row.

9. In a device for automatically loading groups of center-bored circular parts onto rows of basket prongs, an elongated base, a basket conveyor on said base, a loading station adjacent one end of said conveyor, means for intermittently actuating said conveyor to move successive rows of basket prongs to said loading station, a parts positioning block at said loading station extending transversely to said basket conveyor, a plurality of semi-circular recesses in said block opening toward one side thereof, a chute adjacent said block for simultaneously feeding groups of parts into said recesses with the axes of said parts vertically oriented, a chute escapement plate slidably mounted below said block, a plurality of circular apertures in said plate, means for moving said plate being a retaining position in which said apertures are partially misaligned with said recesses and a releasing position in which said apertures are in register with said recesses, end portions of said apertures being aligned with central portions of said recesses when said plate is in its retaining position, a plurality of alignment pins supported above said block, said pins being aligned with a row of basket prongs in loading position, and means for moving said pins from an upper position away from said block to a lower position engaging a row of basket prongs in loading position, said pins when in their lower position passing through the central portions of parts held in said recesses and the end portions of said apertures.

10. The combination according to claim 9, further provided with a plurality of collars slidably mounted on said pins, said collars being engageable with parts within said recesses, when said pins are moved to their lower position, springs engageable with said collars, and means for actuating said springs when said pins are moved to their lower position whereby said collars will urge said parts downwardly.

11. The combination according to claim 10, further provided with a pin supporting bar, said pins being suspended from said bar, said springs being coiled around said pins above said collars, said bar being engageable with the tops of said springs when moved to its lower position whereby said springs will be compressed.

12. In a device for automatically loading groups of center-bored circular parts into baskets having rows of prongs for receiving said parts, an elongated base, a pair of tracks on said base for slidably supporting said baskets, an endless chain conveyor disposed between said tracks, a plurality of basket-engaging members secured to said conveyor at spaced intervals therealong, a loading station adjacent one end of said conveyor, an inclined parts conveyor above said loading station adapted to carry parts in succession with horizontally oriented axes, a curved chute adapted to carry a group of parts simultaneously in a row and re-orient the axes of said parts from horizontal to vertical, a conveyor escapement plate slidably mounted adjacent the exit of said parts conveyor, a slot in said plate for receiving a group of parts from said parts conveyor, means responsive to arrival of a row of basket prongs at said loading station for moving said conveyor escapement plate from a receiving position in which said slot is aligned with said parts conveyor and a releasing position in which said slot is aligned with the entrance of said chute, a parts positioning block adjacent the exit of said chute, semi-circular recesses in said block for receiving parts, guide walls within said chute for guiding parts to said recesses, a chute escapement plate slidably mounted below said block, a plurality of apertures in said chute escapement plate, said chute escapement plate being movable between a retaining position in which end portions of said apertures are aligned with central portions of said recesses, and a releasing position in which said apertures are in register with said recesses, a plurality of alignment pins suspended above said block, time delay means responsive to movement of said conveyor escapement plate to its releasing position for moving said alignment pins from a retracted position above said block to a lower position engaging said basket prongs, collars on said alignment pins engageable with parts within said recesses when said alignment pins are moved to their lower position, springs engageable with said collars for urging said parts downwardly, means responsive to arrival of said alignment pins in their lower position for moving said chute escapement plate to its releasing position, and means responsive to arrival of said chute escapement plate in its releasing position for retracting said chute escapement plate, raising said alignment pins, and advancing said conveyor.

References Cited in the file of this patent

UNITED STATES PATENTS 2,760,318     Brenneck et al. _____________ Aug. 28, 1956